US012699357B2

(12) United States Patent
Denoreaz et al.

(10) Patent No.: US 12,699,357 B2
(45) Date of Patent: Aug. 4, 2026

(54) HOROLOGICAL MODULE ACTUATABLE AT ISOLATED MOMENTS, COMPRISING AUTOMATIC LOCKING MEANS

(71) Applicant: Montres Jaquet Droz SA, La Chaux-de-Fonds (CH)

(72) Inventors: Steven Denoreaz, Bellefontaine (FR); Julien Leskerpit, Pontarlier (FR)

(73) Assignee: Montres Jaquet Droz SA, La Chaux-de-Fonds (CH)

( * ) Notice: Subject to any disclaimer, the term of this patent is extended or adjusted under 35 U.S.C. 154(b) by 342 days.

(21) Appl. No.: 18/475,619

(22) Filed: Sep. 27, 2023

(65) Prior Publication Data

US 2024/0118663 A1 Apr. 11, 2024

(30) Foreign Application Priority Data

Oct. 6, 2022 (EP) .................................... 22199992

(51) Int. Cl.
*G04B 23/03* (2006.01)
*G04B 21/04* (2006.01)

(52) U.S. Cl.
CPC ............. *G04B 23/03* (2013.01); *G04B 21/04* (2013.01)

(58) Field of Classification Search
None
See application file for complete search history.

(56) References Cited

FOREIGN PATENT DOCUMENTS

| | | | | | |
|---|---|---|---|---|---|
| CH | 712642 | A2 * | 1/2018 | | G04F 7/0842 |
| CH | 713 068 | A2 | 4/2018 | | |
| FR | 954275 | A | 12/1949 | | |
| JP | 2017516064 | A | 6/2017 | | |
| WO | 2019/053014 | A1 | 3/2019 | | |
| WO | WO-2019243940 | A1 * | 12/2019 | | G04B 9/02 |

OTHER PUBLICATIONS

Translation of CH712642, Espacenet (Year: 2018).*
European Search Report for EP 22199992 dated Feb. 22, 2023.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A horological module (1) for a horological movement, for example an automaton or a ringing mechanism, the horological module (1) including a plate (2) and a mechanical device (10) able to pass from an idle state, wherein the mechanical device (10) is immobile with respect to the plate (2), to an operating state, wherein at least a part of the mechanical device (10) is able to move with respect to the plate (2) when it is actuated. A barrel (3) provides energy to the mechanical device (10), and a geartrain (20) is actuated by the barrel (3). An element (30) automatically locks the mechanical device (10), and includes a rotary cam (4) and a movable body (7) cooperating with the rotary cam (4), the movable body (7) being able to move between a locking position, in the idle state, and a retracted position, in the operating state).

19 Claims, 6 Drawing Sheets

HOROLOGICAL MODULE ACTUATABLE AT ISOLATED MOMENTS, COMPRISING AUTOMATIC LOCKING MEANS

CROSS REFERENCE TO RELATED APPLICATION

This application claims priority to European Patent Application No. 22199992.3 filed Oct. 6, 2022, the entire contents of which are incorporated herein by reference.

TECHNICAL FIELD OF THE INVENTION

The field of the invention relates to horological modules actuatable at isolated moments, the horological module comprising means for automatically locking the operation of the module.

The invention relates more particularly to horological modules, such as animation mechanisms or ringing mechanisms, that are actuated at isolated moments, and which require a device for automatic stoppage after a given operating period.

The invention also relates to a horological movement of a timepiece, such as a watch, including such a horological module.

TECHNOLOGICAL BACKGROUND

In the horology field, there are mechanisms configured to trigger at a predetermined time or actuatable on demand.

For example, in ringing mechanisms, ringing is configured to sound at a given time, for example in the case of a wake-up function. Other types of ringing mechanism, called minute repeater mechanisms, are ringings actuatable on demand to indicate the time phonically.

Other, so-called animation, mechanisms, consist in animating an object by one or more movements, for example an automaton. Animation of the automaton can be programmed at a predetermined time, or be triggered on demand by actuation means.

Generally, these ringing or animation mechanisms have particular drive means, such as a barrel, that is arranged to provide the energy necessary for operation thereof. Through a geartrain connected to the barrel, the automaton or the ringing is actuated.

The mechanism can be actuated until the barrel is completely discharged. However, some mechanisms comprise automatic stop means, to stop the animation or the ringing after a predetermined time, in particular in order to be able to actuate the mechanism several times with the same loaded barrel.

For example, the document U.S. Pat. No. 3,460,339 describes an automatic alarm mechanism comprising means for locking the alarm mechanism. The automatic locking means comprise a lever cooperating with a rotary cam, the cam including a notch for locking the lever and preventing the mechanism from operating. The alarm mechanism also includes means for releasing the lever to free the alarm mechanism. When the lever is released from the notch, the mechanism operates for the time for the cam to make one turn, until the lever is held by the notch. The cam is driven by drive means to which it is connected.

However, such a mechanism is complex to implement and takes up space.

The documents EP 2880650 and EP 2880498 describe a watch provided with an animation mechanism comprising an automaton, here a bird, the animation of which is driven by a barrel by means of a geartrain.

However, the documents do not describe means for locking the mechanism before the barrel is completely discharged.

SUMMARY OF THE INVENTION

In this context, the aim of the present invention is to overcome all or some of the previously cited drawbacks by proposing a horological module actuatable at isolated moments, which can be stopped automatically after a predetermined operating period, while keeping a reduced volume.

For this purpose, the invention relates to a horological module for a horological movement, the horological module including a plate and a mechanical device able to pass from an idle state, wherein the mechanical device is immobile with respect to the plate, to an operating state, wherein at least a part of the mechanical device is able to move with respect to the plate when it is actuated, the horological module including a barrel for providing energy to the mechanical device, the mechanical device including a geartrain actuatable by the barrel, the horological module furthermore comprising means for automatically locking the mechanical device, the automatic locking means comprising a rotary cam and a movable body cooperating with the rotary cam, the movable body being able to move between a locking position, wherein the mechanical device is in the idle state, and a retracted position, wherein the mechanical device is in the operating state.

The invention is remarkable in that the rotary cam is mounted secured to the barrel.

The timepiece mechanism according to the invention thus proposes an innovative technical solution for obtaining means for automatically locking the mechanical device that are of reduced size.

By means of the invention, there is space saving by associating the rotary cam and the barrel. In addition, having to arrange geartrains between the barrel and the rotary cam is avoided.

According to a particular embodiment of the invention, the movable body is configured to automatically pass from the retracted position to the locking position after a predefined time.

According to a particular embodiment of the invention, the rotary cam is provided with at least one notch, and the movable body is provided with a finger, the finger being inserted in the notch of the rotary cam when the movable body is in the locking position, and the finger being outside the notch when the movable body is in the retracted position.

According to a particular embodiment of the invention, the predefined time corresponds to one turn of the barrel.

According to a particular embodiment of the invention, the automatic locking means comprise an intermediate lever carrying the movable body, the intermediate lever being able to move about a first rotation pivot.

According to a particular embodiment of the invention, the mechanical device comprises a regulation pinion driven by the barrel when it is in rotation by means of the geartrain, the regulation pinion being mounted integrally on a regulation shaft.

According to a particular embodiment of the invention, the automatic locking means are furthermore configured to lock the regulation shaft simultaneously with the locking of the barrel.

According to a particular embodiment of the invention, the automatic locking means comprise a brake lever cooperating with the regulation shaft, the brake lever being able to move about a second rotation pivot between a contact position wherein it is in contact with the regulation shaft to lock it and a position distant from the regulation shaft wherein it allows the regulation shaft to turn.

According to a particular embodiment of the invention, the mechanical device is in the idle position when the brake lever is in the contact position, and the mechanical device is in the operating position when the brake lever is in the distant position.

According to a particular embodiment of the invention, the intermediate lever is configured to actuate the brake lever to make it pass from the contact position to the distant position, the intermediate lever being mechanically connected to the brake lever.

According to a particular embodiment of the invention, the automatic locking means comprise a first return spring acting on the brake lever to hold it in the contact position.

According to a particular embodiment of the invention, the automatic locking means comprise on-demand actuation means for moving the movable body from the locking position to the retracted position.

According to a particular embodiment of the invention, the actuation means comprise a control lever able to rotate about a third rotation pivot between an initial position and a pressed-in position, the control lever actuating the intermediate lever when it is in the pressed-in position.

According to a particular embodiment of the invention, the actuation means comprise a second return spring acting on the control lever to return it to the initial position.

According to a particular embodiment of the invention, the automatic locking means comprise a pawl wheel cooperating with the control lever.

According to a particular embodiment of the invention, the movable body remains in contact with the rotary cam in the operating state of the mechanical device.

The invention also relates to a horological movement comprising such a horological module.

The invention also relates to a timepiece including such a horological movement.

BRIEF DESCRIPTION OF THE FIGURES

The aims, advantages and features of the present invention will emerge from the reading of the following detailed description referring to the following figures.

In all the figures, the common elements bear the same reference numbers unless specified to the contrary.

DETAILED DESCRIPTION OF THE INVENTION

Figure 1:
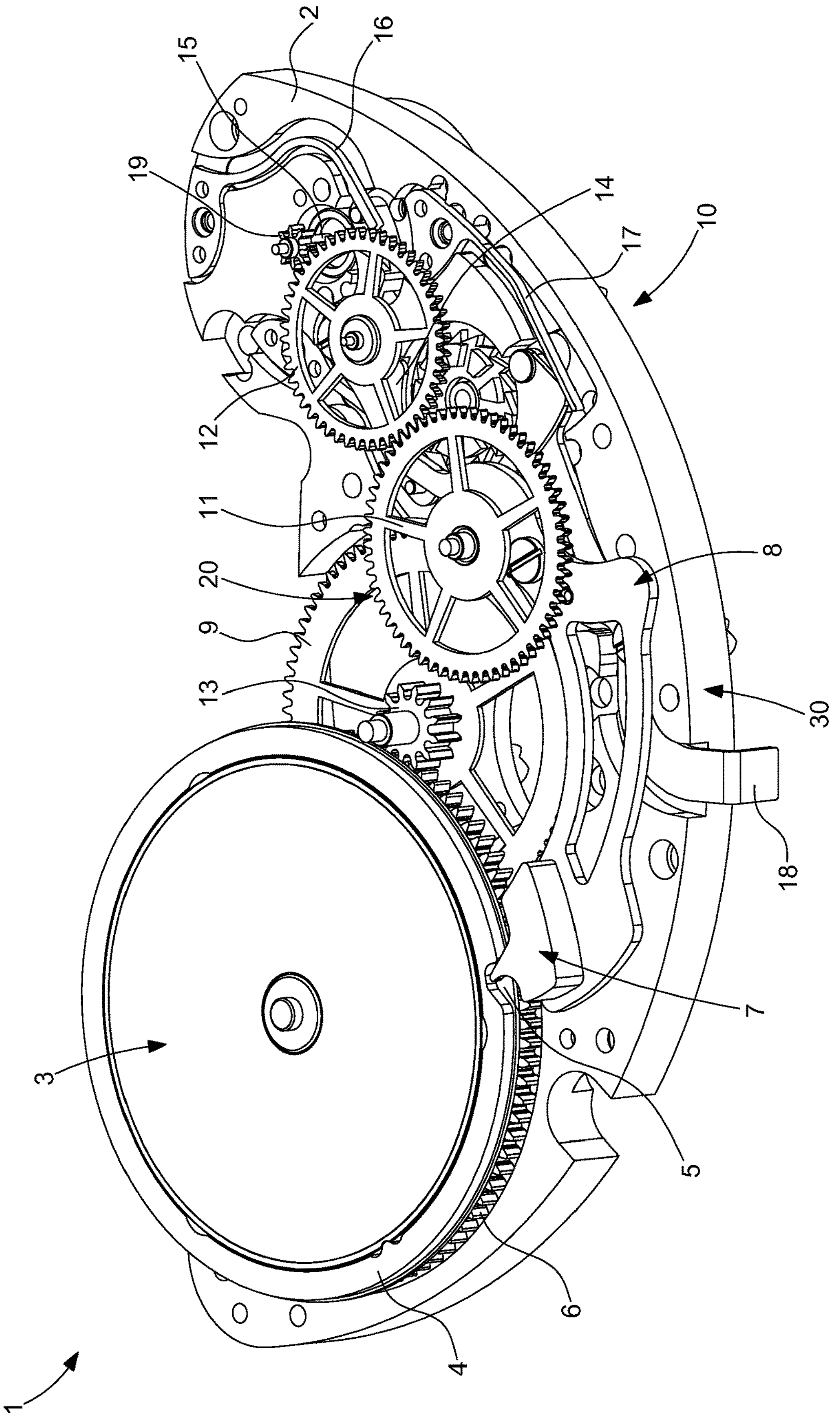
FIG. 1 is a schematic representation in perspective of an embodiment of the horological movement according to the invention.
Figure 2:
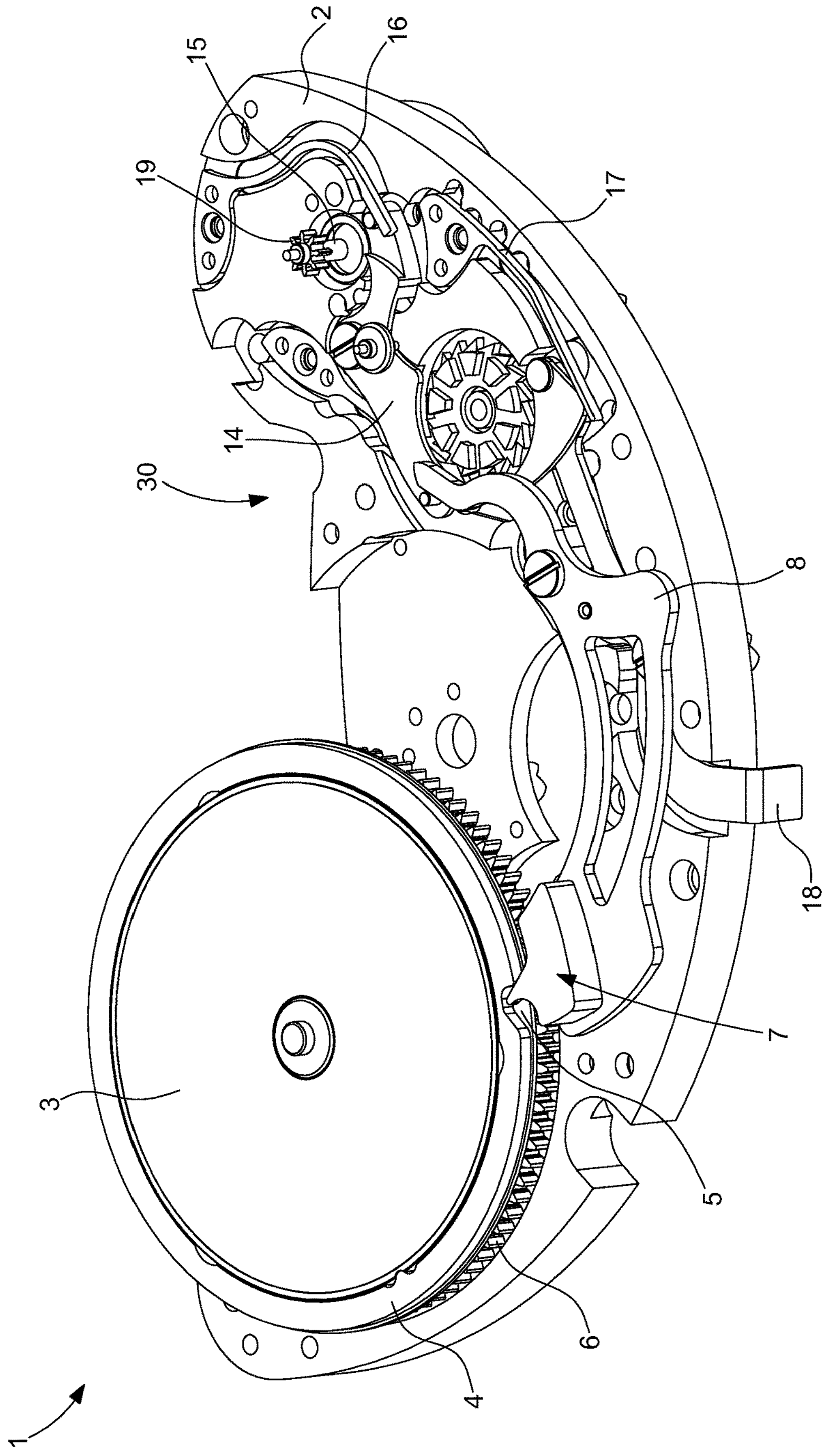
FIG. 2 is a schematic representation in perspective of an embodiment of the horological movement of FIG. 1, in which the geartrains have been removed.
Figure 3:
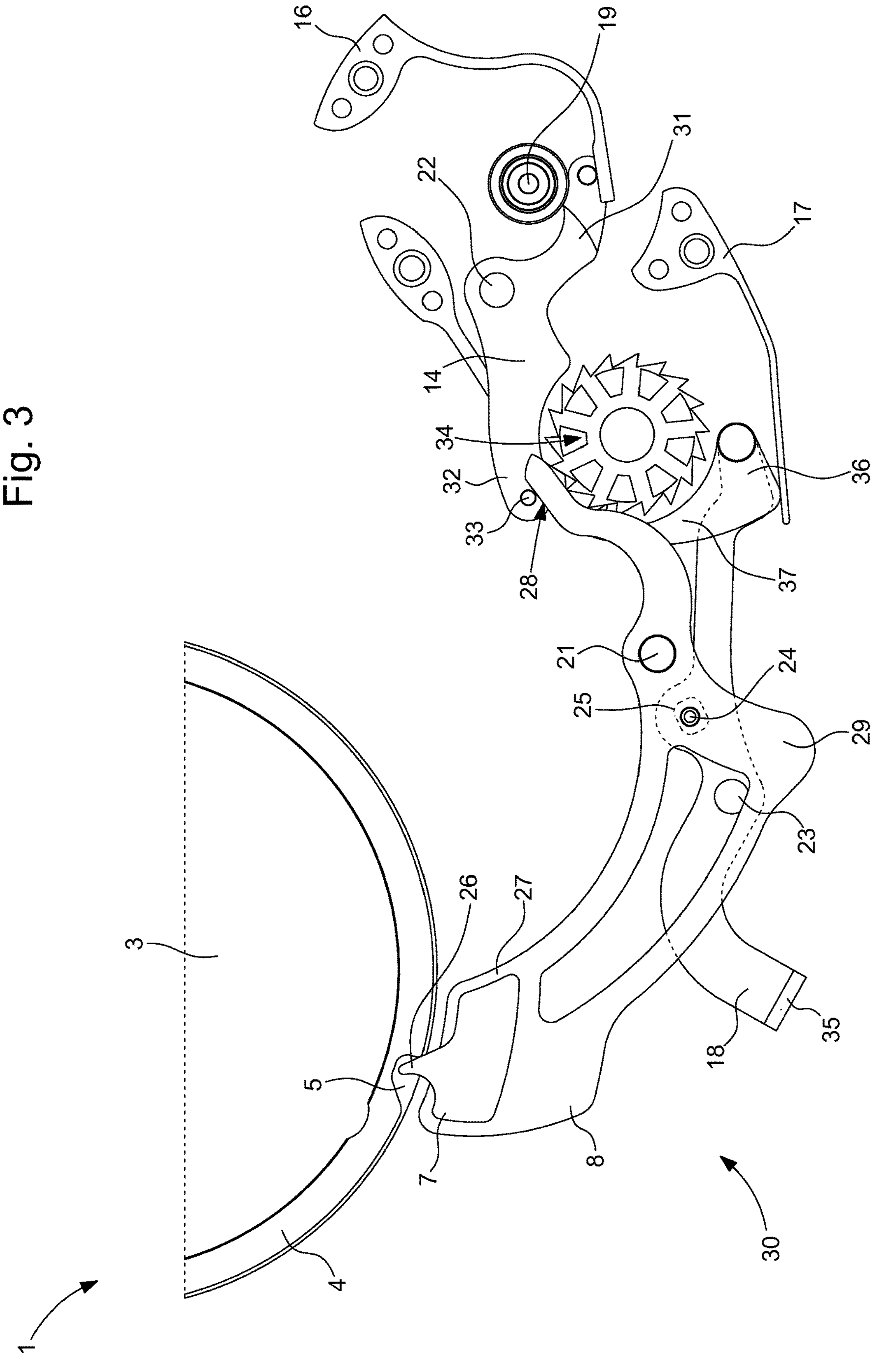
FIG. 3 is a schematic representation in plan view of a part of the horological module of FIG. 2, the horological module being in the idle state.

Shown on FIGS. 1 to 3, the invention relates to a horological module 1 for a horological movement.

The horological movement 1 comprises a plate 2 on which the parts of the module 1 are disposed. The horological module 1 includes in particular a mechanical device 10 able to be triggered at an isolated moment, for example a mechanical device for animating an automaton in this embodiment. The mechanical device 10 can pass from an idle state wherein the mechanical device 10 is immobile with respect to the plate 2, to an operating state wherein the mechanical device 10 is able to move with respect to the plate 2 when it is actuated.

The mechanical device 10 comprises a geartrain 20, for example configured to drive the automaton. Thus, in actuating the geartrains 20, the mechanical device 10 is in the operating state.

To regulate the movement of the automaton, the mechanical device 10 comprises a regulator provided with a regulation pinion 19 mounted integrally on a regulation shaft 15. The regulation shaft 15 is able to rotate to allow rotation of the regulation pinion 19.

There are various types of regulator, some regulators being of the friction type, and others with a magnetic-field brake. The regulators, which are well known to a person skilled in the art, prevent an excessively rapid rotation of the shaft by retaining it by means of the friction or by means of the magnetic brake. Thus the rotation speed of the regulation shaft 15, and therefore of the regulation pinion 19, is controlled by the regulator.

To supply energy to the mechanical device 10, in particular to the geartrain 20, the horological module 1 comprises a barrel 3. The barrel 3 comprises a cylindrical case provided with external peripheral toothing 6. The case is arranged to include a barrel spring inside, so as to cause the case and the external peripheral toothing 6 to turn about a rotation axis.

The geartrain 20 comprises two gear mobiles disposed on the plate: a first mobile provided with a first toothed wheel 9 and a first toothed pinion 13 arranged on the first toothed wheel 9, and a second mobile provided with a second toothed wheel 11 and a second toothed pinion (not visible on the figures), arranged under the second toothed wheel 11. The geartrain 20 furthermore comprises a third toothed wheel 12.

The first mobile, the second mobile and the third toothed wheel 12 are arranged one after the other. The first toothed wheel 9 is arranged partly under the barrel 3. The second toothed wheel 11 is arranged partly above the first toothed wheel 11, and the third toothed wheel 12 is arranged in proximity to the second toothed wheel 11.

The first pinion 13 is meshed with the external toothing 6 of the barrel 3, and the second pinion is meshed by the first gear wheel 9. The third toothed wheel 12 is meshed by the second toothed wheel 11.

When the barrel 3 starts to rotate, it drives the first mobile, the second mobile and the third toothed wheel 12. Thus the regulation pinion 19 and the regulation shaft 15 are driven by the barrel 3 when it is in rotation by means of the geartrain 20, the regulation pinion 19 being meshed by the third toothed wheel 12.

The speed of rotation of the geartrain 20 is therefore regulated by the regulator so that the rotation and therefore the animation of the automaton is controlled.

The horological module 1 comprises means 30 for automatically locking the mechanical device 10. For this purpose, the automatic locking means 30 are configured to be able to lock the mechanical device 10 in the idle state and to leave it in the operating state for a predetermined period of time.

The automatic locking means 30 comprise a rotary cam 4, the rotary cam 4 being arranged to turn about a rotation axis. The cam has a peripheral face provided with a notch 5.

According to the invention, the rotary cam 4 is mounted on the barrel 3 and is integral with the rotation of the barrel 3. The circular peripheral face of the rotary cam 4 surmounts the peripheral toothing 6 of the barrel 3. The notch 5 is formed in the peripheral face, and has a shape curved towards the inside of the rotary cam 4.

The automatic locking means 30 furthermore comprise a movable body 7 provided with a finger 26 extending towards the rotary cam 4. The movable body 7 has a substantially parallelepipedal shape, the finger 26 extending laterally in the plane of the rotary cam 4.

The movable body 7 is able to move between a locking position wherein the finger 26 is inserted in the notch 5 of the rotary cam 4, and a retracted position wherein the movable body 7 is distant from the rotary cam 4, so that the finger 26 remains outside the notch 5.

Figure 5:
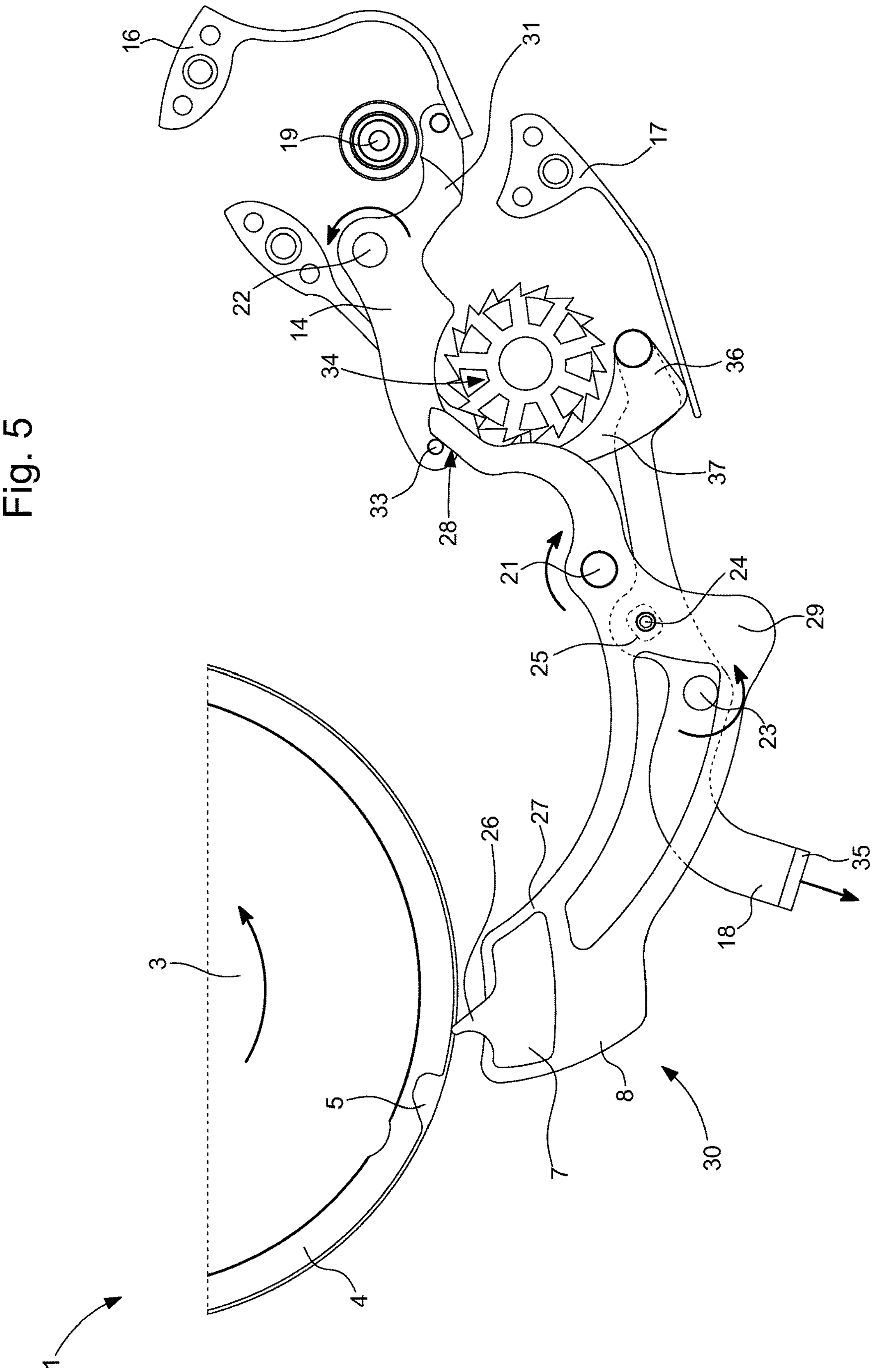
FIG. 5 is a schematic representation in plan view of a part of the horological module of FIG. 2, the horological module being in the operating state.

As shown on FIG. 5, during the rotation of the rotary cam 4, the movable body 7 remains in the retracted position, the end of the finger 26 of the movable body 7 being in contact with the peripheral face of the rotary cam 4 while it turns with the barrel 3. More precisely, the movable body 7 is subjected to a return force that holds it against the rotary cam 4. The origin and the effect of the return force are described below in the description at paragraphs 68 to 70.

Figure 6:
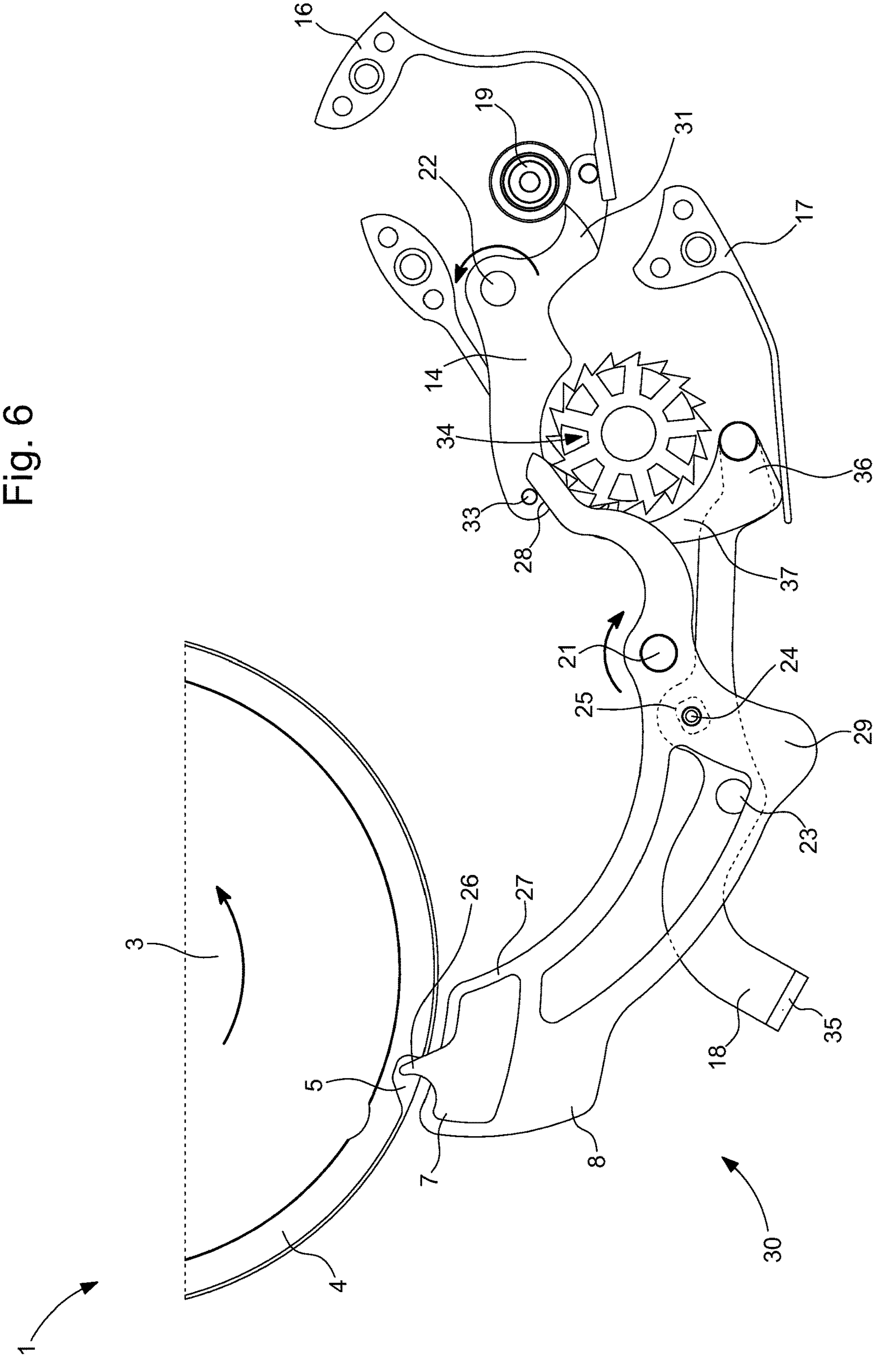
FIG. 6 is a schematic representation in plan view of a part of the horological module of FIG. 2, the horological module passing from the operating state to the idle state.

By virtue of this return force, the movable body 7 automatically moves into the locking position when the finger 26 can be inserted in the notch 5, as shown by FIG. 6. Thus, as soon as the finger 26 faces the notch 5, the movable body 7 is no longer pushed by the peripheral face of the rotary cam 4 into the retracted position, and the finger 26 can return to the locking position, the finger 26 being inserted in the notch 5.

As long as the finger 26 cannot be inserted in the notch 5 of the peripheral face, the barrel 3 continues to turn and the mechanical device 10 is in the operating state. By virtue of this return force, automatic locking means 30 are obtained.

In this embodiment, when the movable body 7 is in the retracted position, the barrel 3 makes one turn until the notch 5 is once again facing the finger 26 of the movable body 7. This is because, as the rotary cam 4 includes a single notch 5, the barrel 3 makes an entire turn before the automatic locking means 30 once again stop it.

In a variant embodiment, not shown on the figures, the rotary cam includes two or more notches, so that the barrel and the mechanical device are stopped at each notch. Consequently, the mechanical device operates only during the rotation of the barrel between two notches, i.e. for a period less than one turn of the barrel.

To carry and move the movable body 7, the automatic locking means 30 comprise an intermediate lever 8 arranged on the plate 2, the movable body 7 being mounted at a first end 27 of the intermediate lever 8. The intermediate lever 8 is mounted on a rotation pivot 21 so as to be able to tilt and modify the position of the movable body 7 from the locking position to the retracted position.

The intermediate lever 8 has a curved shape comprising at the front two substantially parallel curved arms connected at the first end 27, the two arms delimiting an open space. The intermediate lever 8 includes a third curved arm extending towards the rear to form a second end 28 of the intermediate lever 8. The three arms are connected by an intermediate joint 29 provided with the rotation pivot 21.

A return force is applied to the second end 28 of the intermediate lever 8 to keep the movable body 7 in contact with the peripheral face of the rotary cam 4 by the finger 26. Thus a spring effect is obtained, which pushes the first end 27 of the intermediate lever 8 towards the rotary cam 4, in order automatically to return the movable body 7 to the locking position, when the notch 5 of the peripheral face is located facing the finger 26.

In this embodiment, the horological module 1 comprises a brake lever 14 configured to come into contact with the regulation shaft 15 to prevent it from turning. The brake lever 14 comprises a first end 31 provided with a beak able to come into contact with the regulation shaft.

The mechanical device 10 is in the idle position when the brake lever 14 is in the contact position, and the mechanical device 10 is in the operating position when the brake lever 14 is in the distant position.

In this embodiment, the mechanical device 10 is stopped when the brake lever 14 is in the contact position. In other words, the mechanical device 10 is stopped by the locking of the regulation shaft 19 by the brake lever 14. This is because, if the regulation shaft 15 is locked, the geartrain 20 can no longer turn since the regulation pinion 19 holds the third wheel 12.

Preferably, the mechanical device 10 is not stopped, by a locking of the barrel 3, when the finger 26 of the movable element 7 is inserted in the notch 5 of the rotary cam 4. The only function of the mobile 7, the finger 26 and the notch 5 is to trigger the locking of the mechanical device 10 by causing the tilting of the brake lever 14 into the position of contact with the regulation shaft 15 after the predefined time.

In a variant embodiment, the automatic locking means 30 are configured to simultaneously lock the rotation of the barrel 3 and the rotation of the regulation shaft 15. Thus, when the finger 26 of the movable element 7 enters the notch 5 of the rotary cam 4, the barrel 3 is locked, and simultaneously the brake lever 14 goes into the position of contact with the regulation shaft 15 to lock it.

The brake lever 14 is mounted so as to rotate about a second rotation pivot 22 so as to be able to tilt from a position of contact with the regulation shaft 15 to a distant position to leave it free to turn. The brake lever 14 has an angled shape, the second rotation pivot 22 being arranged on the curvature of the elbow.

The automatic locking means 30 also comprise a first return spring 16, which bears on the first end 31 of the brake lever 14 to hold it in contact with the regulation shaft 15, in the contact position. The first return spring 16 comprises a curved flexible blade attached to the plate on one side and free on the other, the free part being folded over a first pin extending from the first end 31 of the brake lever 14.

For this purpose, the brake lever 14 comprises a second end 32 on which the second end 28 of the intermediate lever 8 bears. The second end 32 of the brake lever 14 is provided with a pin 33 lying in the plane of the intermediate lever 8. The pin of the brake lever 14 bears on the second end 28 of the intermediate lever 8.

Thus, by virtue of the pin 33, the return force of the first return spring 16 is transmitted to the intermediate lever 8, so that it is in a position to set the movable body 7 against the rotary cam 4.

The horological module 1 furthermore comprises on-demand actuation means for tilting the intermediate lever 8 and consequently the brake lever 14, so that the movable body 7 is moved from the locking position to the retracted position, and simultaneously the regulation shaft 15 is released.

For this purpose, the actuation means comprise a control lever 18 mounted so as to rotate about a third rotation pivot 23.

The control lever 18 comprises a first end 35 forming an actuation pusher. The control lever 18 has an angled shape provided with a short segment comprising the first end 35, and a long segment at the middle of which the third rotation pivot 23 is arranged. The second end 36 of the control lever 18 is at the end of the long segment.

The control lever 18 is partly mounted underneath the intermediate lever 8.

The control lever 18 furthermore comprises a hook 37 mounted rotatably at the second end 36 of the control lever 18. The hook 37 cooperates with a pawl wheel 34 arranged in proximity to the second end 36 of the control lever 18.

The automatic locking means 30 comprise a second return spring 17 similar to the first return spring 16, which is configured to bear on the hook 37, in order to exert a force tending to put it in relationship with the pawl wheel 34.

The control lever 18 is also connected to the intermediate lever 8 by a through hole 25 surrounding a blom stud 24 mounted on the intermediate lever 8. Thus, when the control lever 18 pivots, it pulls on the blom stud 24 of the intermediate lever 8, to make it tilt in its turn, so as to move the movable body 7 into the retracted position to release the barrel 3. Simultaneously, the intermediate lever 8 bears on the brake lever 14 in order to release the regulation shaft 15, the regulation pinion 19, and therefore the mechanical device 10, which goes into the operating position.

Figure 4:
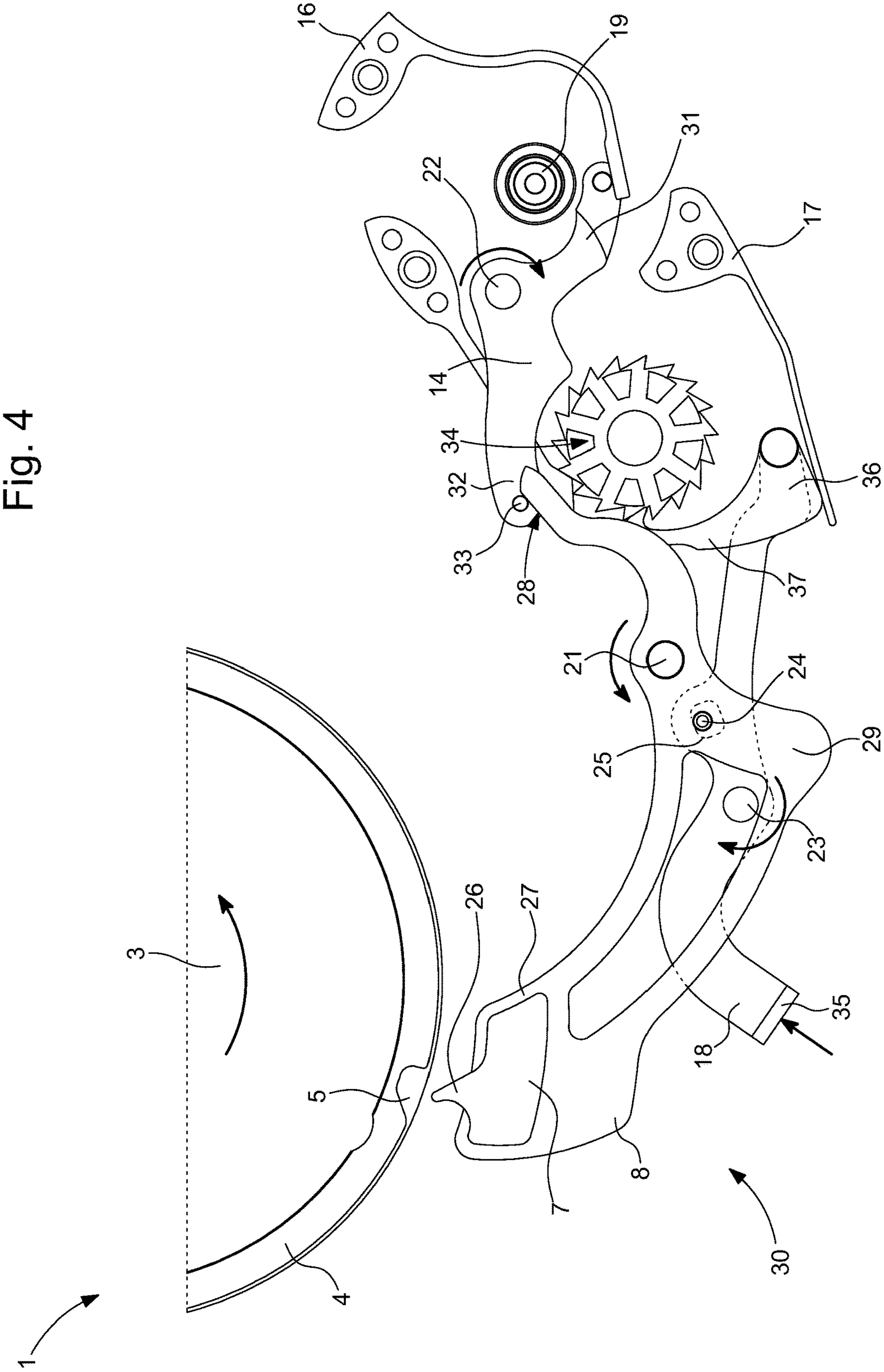
FIG. 4 is a schematic representation in plan view of a part of the horological module of FIG. 2, at the moment when the mechanical device 10 is triggered.

On FIG. 4, when a user presses on the first end 35, they actuate the control lever 18, which turns in a first direction. The control lever 18 pulls the intermediate lever 8 in rotation in a second direction opposite to the first direction. And the intermediate lever 8 pushes the brake lever 14 in the first direction, to release the regulation shaft 15 in accordance with the method described before.

During the operation of the mechanical device 10 and the rotation of the barrel 3, as shown on FIG. 5, the control lever 18 resumes its initial position by virtue of the second return spring 16, when the user releases the end 35, while the intermediate lever 8 and the brake lever 14 remain substantially in the same positions as long as the movable element 7 remains in the retracted position.

If the user does not release the control lever 18, automatic stoppage cannot be triggered, and the barrel continues to turn and to drive the geartrain 20.

On FIG. 6, as soon as the finger 26 of the movable body 7 can enter the notch 5 in the locking position, the intermediate lever 8 regains its initial position. Since the brake lever 14 is no longer pushed by the intermediate lever 8, it also regains its position of contact with the regulation shaft 15 by virtue of the return force provided by the first return spring 16, and thus locks the regulation pinion 19 and the geartrains 20 of the mechanical device 10.

In the variant embodiment of simultaneous locking, the movable body 7 also locks the rotation of the barrel 3 when the finger 26 is inserted in the notch 5 of the rotary cam 4.

Thus the mechanical device 10 of the horological module 1 is stopped after one turn of the barrel 3, but it can once again be set running by actuating the control lever 18, as long as the barrel 3 is not completely discharged.

The invention also relates to a horological movement including a horological module 1 as described previously, as well as a timepiece comprising such a horological movement.

Naturally, the invention is not limited to the embodiments described with reference to the figures and variants could be envisaged without departing from the scope of the invention.

The invention claimed is:

1. A horological module (1) for a horological movement, comprising:

a plate (2) and a mechanical device (10) able to pass from an idle state, wherein the mechanical device (10) is immobile with respect to the plate (2), to an operating state, wherein at least a part of the mechanical device (10) is able to move with respect to the plate (2) when it the mechanical device (10) is actuated;

a barrel (3) for providing energy to the mechanical device (10), the mechanical device (10) including a geartrain (20) actuatable by the barrel (3); and automatic locking means (30) for automatically locking the mechanical device (10), the automatic locking means (30) comprising a rotary cam (4) and a movable body (7) cooperating with the rotary cam (4), the movable body (7) being able to move between a locking position, wherein the mechanical device (10) is in the idle state, and a retracted position, wherein the mechanical device (10) is in the operating state, wherein the rotary cam (4) is mounted to the barrel (3) such that an axis of rotation of the rotary cam (4) coincides with an axis of rotation of the barrel (3) and a rotation of the rotary cam (4) is integral with a rotation of the barrel (3).

2. The horological movement according to claim 1, wherein the movable body (7) is configured to automatically pass from the retracted position to the locking position after a predefined time.

3. The horological module according to claim 2, wherein the predefined time corresponds to one turn of the barrel (2).

4. The horological movement according to claim 1, wherein the rotary cam (4) is provided with at least one notch (5), and the movable body (7) is provided with a finger (26), the finger (26) being inserted in the notch (5) of the rotary cam (4) when the movable body (7) is in the locking position, and the finger (26) being outside the notch (5) when the movable body (7) is in the retracted position.

5. The horological module according to claim 1, wherein the automatic locking means (30) comprise an intermediate lever (8) carrying the movable body (7), the intermediate lever (8) being able to move about a first rotation pivot (21).

6. The horological module according to claim 5, wherein the mechanical device (10) comprises a regulation pinion (19) driven by the barrel (3) when it the regulation pinion (19) is in rotation by means of the geartrain (20), the regulation pinion (19) being mounted to a regulation shaft (15).

7. The horological module according to claim 6, wherein the automatic locking means (30) are configured to lock the regulation shaft (15) when the mechanical device (10) is in the idle state.

8. The horological module according to claim 7, wherein the automatic locking means (30) comprise a brake lever (14) cooperating with the regulation shaft (15), the brake lever (14) being able to move about a second rotation pivot (22) between a contact position wherein brake lever (14) is in contact with the regulation shaft (15) to lock the regulation shaft (15) and a position distant from the regulation shaft (15) wherein brake lever (14) allows the regulation shaft (15) to turn.

9. The horological module according to claim 8, wherein the mechanical device (10) is in the idle position when the brake lever (14) is in the contact position, and the mechanical device (10) is in the operating position when the brake lever (14) is in the distant position.

10. The horological module according to claim 9, wherein the intermediate lever (8) is configured to actuate the brake lever (14) to make it the brake lever (14) pass from the contact position to the distant position, the intermediate lever (8) being mechanically connected to the brake lever (14).

11. The horological module according to claim 10, wherein the automatic locking means (30) comprise a first return spring (16), acting on the brake lever (14) to hold the brake lever (14) in the contact position.

12. The horological module according to claim 1, wherein the automatic locking means (30) comprise on-demand actuation means for moving the movable body (7) from the locking position to the retracted position.

13. The horological module according to claim 12, wherein the actuation means comprise a control lever (18) able to rotate about a third rotation pivot (23) between an initial position and a pressed-in position, the control lever (18) actuating an intermediate lever (8) when it the control lever (18) is in the pressed-in position.

14. The horological module according to claim 13, wherein the actuation means comprise a second return spring (16) acting on the control lever (18) to return it to the initial position.

15. The horological module according to claim 1, wherein the rotary cam (4) rotates in the operating state of the mechanical device (10), and wherein the movable body (7) remains in contact with the rotary cam (4) during the rotation of the rotary cam (4) in the operating state of the mechanical device (10).

16. A horological movement for a timepiece including the horological module (1) according to claim 1.

17. The timepiece including the horological movement (1) according to claim 16.

18. The horological movement according to claim 1, wherein the mechanical device (10) furthermore comprises a regulator for regulating a speed of the mechanical device (10).

19. The horological movement according to claim 18, wherein the regulator comprises a regulation pinion (19) driven by the barrel (3) when the regulation pinion (19) is in rotation by means of the geartrain (20), and a regulation shaft (15), the regulation pinion (19) being mounted to the regulation shaft (15).

* * * * *